G. E. OTIS.
METHOD OF MAKING POLYGONAL GUIDES.
APPLICATION FILED NOV. 2, 1917.

1,289,887.

Patented Dec. 31, 1918.

INVENTOR
Gerald E. Otis
BY
Marshall C. Dearborn
ATTORNEYS

UNITED STATES PATENT OFFICE.

GERALD E. OTIS, OF BUFFALO, NEW YORK, ASSIGNOR OF ONE-HALF TO WALTER J. TOWERS, OF TOLEDO, OHIO.

METHOD OF MAKING POLYGONAL GUIDES.

1,289,887.

Specification of Letters Patent. Patented Dec. 31, 1918.

Application filed November 2, 1917. Serial No. 199,883.

*To all whom it may concern:*

Be it known that I, GERALD E. OTIS, a citizen of the United States of America, and a resident of Buffalo, county of Erie, and State of New York, have invented certain new and useful Improvements in Methods of Making Polygonal Guides, of which the following is a specification, reference being had to the accompanying drawings, forming a part thereof.

My invention relates to new and useful improvements in guides for the cams of drills for square or other polygonal holes and more particularly to the method of making them.

The object of the invention is to provide by a novel method a guide of accurate shape and of hardened metal so that the chief objectionable features of such cam guides as have been available heretofore are overcome.

I have found that with a perfected square hole drill mechanism it is important to have the drill cam guide accurate to a greater nicety than is possible to attain by such methods as have been employed, and that such guides are subjected to so much rubbing friction that they soon wear out of true. It is also a fact that hardening a cam guide after it has been formed, distorts its surface to such a degree that it fails to meet the requirements for which it is provided.

In order that my invention may be thoroughly understood I will now proceed to describe the same in the following specification, and then point out the novel features thereof in appended claims.

Referring to the drawings.

Like characters of reference designate corresponding parts in all the figures.

10 and 11 are the guide members which are alike with the exception of the fact that the corners of the members 11 are cut off as at 12 to correspond in lateral dimension to one side of the finished cam guide. These members are each provided with a pair of spaced threaded and countersunk holes 13.

According to my method of construction, these members are made of tool steel which is first hardened and their surfaces A ground flat. The ends 12 of the members 11 are then ground to be at right angles to the surface A and to such extent to make the lateral dimension of this surface correspond exactly with the desired size of the finished guide.

Figure 1:
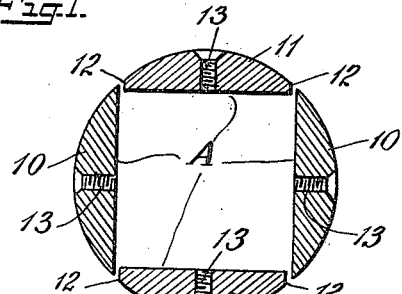
Figure 1 is a sectional end elevation of the guide members before they are assembled.
Figure 2:
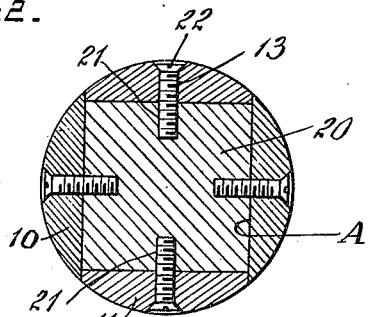
Fig. 2 is a similar view of the same members assembled on a mandrel.
Figure 4:
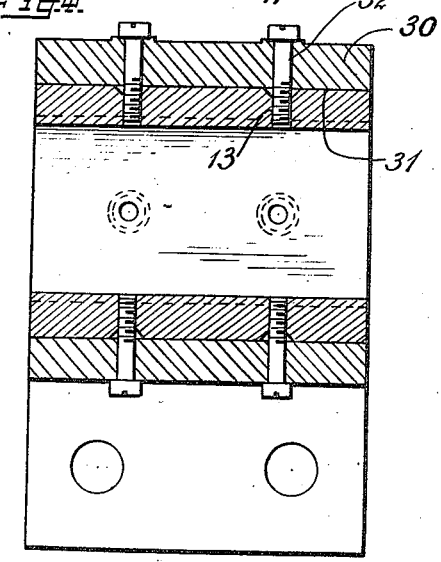
Fig. 4 is a longitudinal section of the parts shown in Fig. 3.
Figure 3:
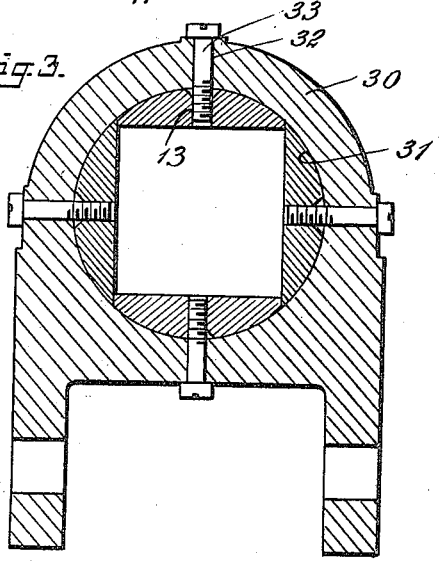
Fig. 3 is a sectional end elevation of the guide members and housing.

The members 10 and 11 are then assembled as shown in Fig. 2, on a square mandrel 20 which has a cross section of exactly the same size as that of the finished guide. The mandrel is provided with threaded holes 21 so spaced as to receive flat head screws 22 which are slightly less in diameter than the threaded holes 13 in the guide members so that they will clear these holes 13. While thus assembled the hardened guide members are ground to a cylindrical form of predetermined diameter. The guide members are thus completed and may then be removed from the mandrel.

30 is a housing in which is a finished cylindrical bore 31 of the diameter of the assembled guide members. It is also provided with radially disposed clearance holes 32 spaced to correspond with the threaded holes 13 in the guide members. The guide members are inserted in the bore 31 of the housing and held in place by screws 33 which engage the threads of the holes 13 in the guide members.

The cam guide is then complete and ready to use with a suitably formed cam of a drill. It is accurate in form and capable of withstanding the wear of the cam which rotates irregularly within it.

It is obvious that cam guides made in accordance with this invention may be similarly constructed for use with drills arranged to cut other polygonal holes than squares.

What I claim is:

1. The herein described method of constructing a guide for the cams of polygonal hole drills which comprises forming a plurality of guide members of approximately the required form, hardening said members, finishing the inner surface of each member, affixing said members to a mandrel having its outer surfaces like the inner surfaces of the desired cam guide, finishing the outside of the members thus assembled to a cylindrical form of desired diameter, removing the members from the mandrel, and assembling the members within a housing provided with a bore of the same diameter as that of the outside of the finished guide members.

2. The herein described method of constructing a guide for the cams of polygonal hole drills which comprises forming a plurality of guide members of approximately the required form, providing in said members countersunk threaded transverse holes, hardening said members, finishing a flat surface upon each member, affixing said members to a mandrel having its outer surfaces like the inner surfaces of the desired cam guide, by screws of a diameter to clear the threaded holes in the guide members, finishing the outside of the members thus assembled to a cylindrical form of desired diameter, removing the members from the mandrel, assembling the members within a housing provided with a bore of the same diameter as that of the outside of the finished guide members and affixing said members to the housing by screws passing through the housing into the threaded holes in the members.

In witness whereof, I have hereunto set my hand this 1 day of Nov., 1917.

GERALD E. OTIS.